(12) United States Patent
Dalfra (10) Patent No.: US 11,675,363 B2
(45) Date of Patent: Jun. 13, 2023

(54) AUTOMATIC WORKING SYSTEM, SELF-MOVING APPARATUS AND CONTROL METHOD THEREOF

(71) Applicant: Positec Power Tools (Suzhou) Co., Ltd, Jiangsu (CN)

(72) Inventor: Davide Dalfra, Vicenza (IT)

(73) Assignee: Positec Power Tools (Suzhou) Co., Ltd, Suzhou (CN)

( * ) Notice: Subject to any disclaimer, the term of this patent is extended or adjusted under 35 U.S.C. 154(b) by 307 days.

(21) Appl. No.: 16/484,454

(22) PCT Filed: Feb. 13, 2018

(86) PCT No.: PCT/CN2018/076709
§ 371 (c)(1),
(2) Date: Aug. 7, 2019

(87) PCT Pub. No.: WO2018/149404
PCT Pub. Date: Aug. 23, 2018

(65) Prior Publication Data
US 2019/0369629 A1    Dec. 5, 2019

(30) Foreign Application Priority Data

Feb. 15, 2017    (CN) .......................... 201710081901.1

(51) Int. Cl.
*G05D 1/00*         (2006.01)
*G05D 1/02*         (2020.01)

(52) U.S. Cl.
CPC ......... *G05D 1/0223* (2013.01); *G05D 1/0088* (2013.01); *G05D 2201/0208* (2013.01)

(58) Field of Classification Search
CPC .............. G05D 1/0223; G05D 1/0088; G05D 2201/0208; G05D 2201/0201; A01D 34/008
See application file for complete search history.

(56) References Cited

U.S. PATENT DOCUMENTS 6,109,009 A * 8/2000 Benson .................. B60L 58/21
56/10.2 G
7,962,256 B2 * 6/2011 Stevens ................ B62K 11/007
180/65.245

(Continued)

FOREIGN PATENT DOCUMENTS

CN          102057800 A     5/2011
CN          102232331 A     11/2011
(Continued)

*Primary Examiner* — Peter D Nolan
*Assistant Examiner* — Peter Y Ning
(74) *Attorney, Agent, or Firm* — Dentons US LLP (57) ABSTRACT

Embodiments of the present invention relates to a self-moving device, moving and working in a working region, and including: a housing; a movement module, mounted at the housing, and driven by a drive motor to enable the self-moving device to move; a control module, controlling movement and working of the self-moving device; and a detection unit, electrically connected to the control module, and detecting a movement and/or status parameter of the self-moving device, where when the detection unit detects that the movement and/or status parameter of the self-moving device satisfies a preset condition, the control module alternately decreases and increases an acceleration of the movement of the self-moving device, so as to keep a speed of the movement of the self-moving device in a preset range.

16 Claims, 3 Drawing Sheets

(56) References Cited

U.S. PATENT DOCUMENTS

| | | | |
|---|---|---|---|
| 8,352,116 B2 | | 1/2013 | Boylston et al. |
| 8,634,960 B2 | * | 1/2014 | Sandin .................... B60L 50/66 |
| | | | 700/258 |
| 8,656,550 B2 | * | 2/2014 | Jones .................... A47L 9/2894 |
| | | | 15/360 |
| 10,113,280 B2 | * | 10/2018 | Letsky ...................... E01H 5/00 |
| 2004/0181323 A1 | * | 9/2004 | Yuan ..................... B60W 30/16 |
| | | | 701/93 |
| 2009/0145673 A1 | * | 6/2009 | Soliman ................. B60K 6/547 |
| | | | 701/22 |
| 2011/0015812 A1 | * | 1/2011 | Vogel .................. B60W 30/143 |
| | | | 701/22 |
| 2013/0046448 A1 | * | 2/2013 | Fan ...................... A01D 34/824 |
| | | | 701/50 |
| 2015/0239474 A1 | * | 8/2015 | Nakamura ............ B60L 3/0061 |
| | | | 180/170 |
| 2015/0314775 A1 | * | 11/2015 | Dextreit ................ B60W 10/08 |
| | | | 180/65.265 |
| 2016/0302354 A1 | * | 10/2016 | Franzius .............. A01D 34/008 |
| 2016/0325744 A1 | * | 11/2016 | Yang ................. B60W 50/0205 |
| 2017/0188510 A1 | * | 7/2017 | Einecke ................ A01D 34/008 |
| 2017/0269604 A1 | * | 9/2017 | Shiromizu ................. G06T 7/73 |
| 2018/0244247 A1 | * | 8/2018 | Carlsson ............. B60W 30/143 |

FOREIGN PATENT DOCUMENTS

| | | |
|---|---|---|
| CN | 102880175 A | 1/2013 |
| CN | 103217898 A | 7/2013 |
| CN | 204965182 U | 1/2016 |
| CN | 106160620 A | 11/2016 |
| CN | 205742042 U | 11/2016 |
| CN | 106325287 A | 1/2017 |
| JP | 2000075925 A | 3/2000 |
| WO | 2014129941 A | 8/2014 |

* cited by examiner

AUTOMATIC WORKING SYSTEM, SELF-MOVING APPARATUS AND CONTROL METHOD THEREOF

This application is a National Stage application of International Application No. PCT/CN2018/076709 filed on Feb. 13, 2018, and claims priority to Chinese Application No. 201710081901.1 filed Feb. 15, 2017, which is hereby incorporated by reference in its entirety if fully set forth herein.

BACKGROUND

Technical Field

The present invention relates to an automatic working system, and further relates to a self-moving device and a control method thereof.

Related Art

An automatic working system such as an automatic lawn mower system can automatically perform a task without manual supervision, and becomes increasingly popular among users for saving them from tedious work.

An automatic lawn mower moves and works in a working region defined by a border, and may pose a safety problem if moving beyond the working region. The automatic lawn mower is usually controlled to automatically turn around or reverse when moving near the border. There may be various landforms such as a slope in a working environment of the automatic lawn mower. The automatic lawn mower gains speed while descending the slope. If at this time the automatic lawn mower detects the border, for example, detects a boundary of the working region, the automatic lawn mower may fail to turn around or reverse in time as a result of the excessively high speed to rush across the boundary to pose a safety problem. In addition, when the automatic lawn mower moves too fast, a lawn may be poorly cut, and the automatic lawn mower may work unstably, leading to a series of problems.

SUMMARY

A problem to be resolved by the embodiments of the present invention is to provide an automatic working system and a self-moving device and a control method thereof that ensure safe and stable running.

The technical solution used by the present invention to resolve the problem in the prior art is as follows: A self-moving device, moving and working in a working region, and comprising: a housing; a movement module, mounted at the housing, and driven by a drive motor to enable the self-moving device to move; a control module, controlling movement and working of the self-moving device; and a detection unit, electrically connected to the control module, and detecting a movement and/or status parameter of the self-moving device, wherein when the detection unit detects that the movement and/or status parameter of the self-moving device satisfies a preset condition, the control module alternately decreases and increases an acceleration of the movement of the self-moving device, so as to keep a speed of the movement of the self-moving device in a preset range.

In one embodiment, the movement and/or status parameter of the self-moving device comprises the speed or acceleration of the movement of the self-moving device, and the preset condition is that the speed or acceleration of the movement of the self-moving device is greater than or equal to a first threshold.

In one embodiment, the movement and/or status parameter of the self-moving device comprises a downward tilt angle of the self-moving device, and the preset condition is that the downward tilt angle of the self-moving device is greater than or equal to a preset angle value.

In one embodiment, the detection unit comprises at least one of an accelerometer, a tachometer, an inclinometer, and a gyroscope.

In one embodiment, the control module alternately decreases and increases a working current of the drive motor to alternately decrease and increase the acceleration of the movement of the self-moving device.

In one embodiment, that the control module alternately reduces and increases a working current of the drive motor comprises alternately switching off and on the working current of the drive motor.

An automatic working system, comprising the self-moving device according to any one of the above.

A control method of a self-moving device, a self-moving device moving and working in a working region, and the self-moving device comprising a movement module, driven by a drive motor to enable the self-moving device to move, wherein the control method of a self-moving device comprises the following steps: detecting a movement and/or status parameter of the self-moving device; determining whether the movement and/or status parameter of the self-moving device satisfies a preset condition; and if the preset condition is satisfied, alternately decreasing and increasing an acceleration of the movement of the self-moving device, so as to keep a speed of the movement of the self-moving device in a preset range.

In one embodiment, the detecting a movement and/or status parameter of the self-moving device comprises: detecting the speed or acceleration of the movement of the self-moving device; and the determining whether the movement and/or status parameter of the self-moving device satisfies a preset condition comprises determining whether the speed or acceleration of the movement of the self-moving device is greater than or equal to a first threshold.

In one embodiment, the detecting a movement and/or status parameter of the self-moving device comprises: detecting a downward tilt angle of the self-moving device; and the determining whether the movement and/or status parameter of the self-moving device satisfies a preset condition comprises: determining whether the downward tilt angle of the self-moving device is greater than or equal to a preset angle value.

In one embodiment, the keeping a speed of the movement of the self-moving device in a preset range comprises: controlling the speed of the movement of the self-moving device to be less than or equal to a preset speed value.

In one embodiment, a working current of the drive motor is alternately decreased and increased to alternately decrease and increase the acceleration of the movement of the self-moving device.

In one embodiment, the alternately decreasing and increasing the working current of the drive motor comprises alternately switching off and on the working current of the drive motor.

In one embodiment, the step of alternately decreasing and increasing an acceleration of the movement of the self-moving device comprises: determining whether the speed or acceleration of the movement of the self-moving device is less than or equal to a second threshold, and if the speed or acceleration is less than or equal to the second threshold, increasing the acceleration of the movement of the self-moving device, wherein the second threshold is less than a first threshold.

A self-moving device, moving and working in a working region, and comprising: a housing; a movement module, mounted at the housing, and driven by a drive motor to enable the self-moving device to move; a control module, controlling movement and working of the self-moving device; and a detection unit, electrically connected to the control module, and detecting a movement and/or status parameter of the self-moving device, wherein when the detection unit detects that the movement and/or status parameter of the self-moving device satisfies a preset condition, the control module controls the self-moving device to intermittently brake.

A control method of a self-moving device, a self-moving device moving and working in a working region, and the self-moving device comprising a movement module, driven by a drive motor to enable the self-moving device to move, wherein the control method of a self-moving device comprises the following steps: detecting a movement and/or status parameter of the self-moving device; determining whether the movement and/or status parameter of the self-moving device satisfies a preset condition; and if the preset condition is satisfied, controlling the self-moving device to intermittently brake.

A self-moving device is provided, moving and working in a working region, and including: a housing; a movement module, mounted at the housing, and driven by a drive motor to enable the self-moving device to move; a control module, controlling movement and working of the self-moving device; and a detection unit, electrically connected to the control module, and detecting a movement and/or status parameter of the self-moving device, where when the detection unit detects that the movement and/or status parameter of the self-moving device satisfies a preset condition, the control module intermittently decreases an acceleration of the movement of the self-moving device, so as to keep a speed of the movement of the self-moving device in a preset range.

A control method of a self-moving device is provided, a self-moving device moving and working in a working region, the self-moving device including a movement module, driven by a drive motor to enable the self-moving device to move, where the control method of a self-moving device includes the following steps: detecting a movement and/or status parameter of the self-moving device; determining whether the movement and/or status parameter of the self-moving device satisfies a preset condition; and if the preset condition is satisfied, intermittently decreasing an acceleration of the movement of the self-moving device, so as to keep a speed of the movement of the self-moving device in a preset range.

Compared with the prior art, the beneficial effect of the present invention is as follows: When a self-moving device descends a slope, an acceleration of the movement of the self-moving device is alternately decreased and increased to keep a speed of the movement of the self-moving device in a preset range, thereby avoiding a series of problems such as safety hazards that occur because the speed of the movement of the self-moving device is excessively high.

BRIEF DESCRIPTION OF THE DRAWINGS

The foregoing objectives, technical solutions, and beneficial effects of the present invention may be implemented by using the accompanying drawings below.

DETAILED DESCRIPTION

Figure 1:
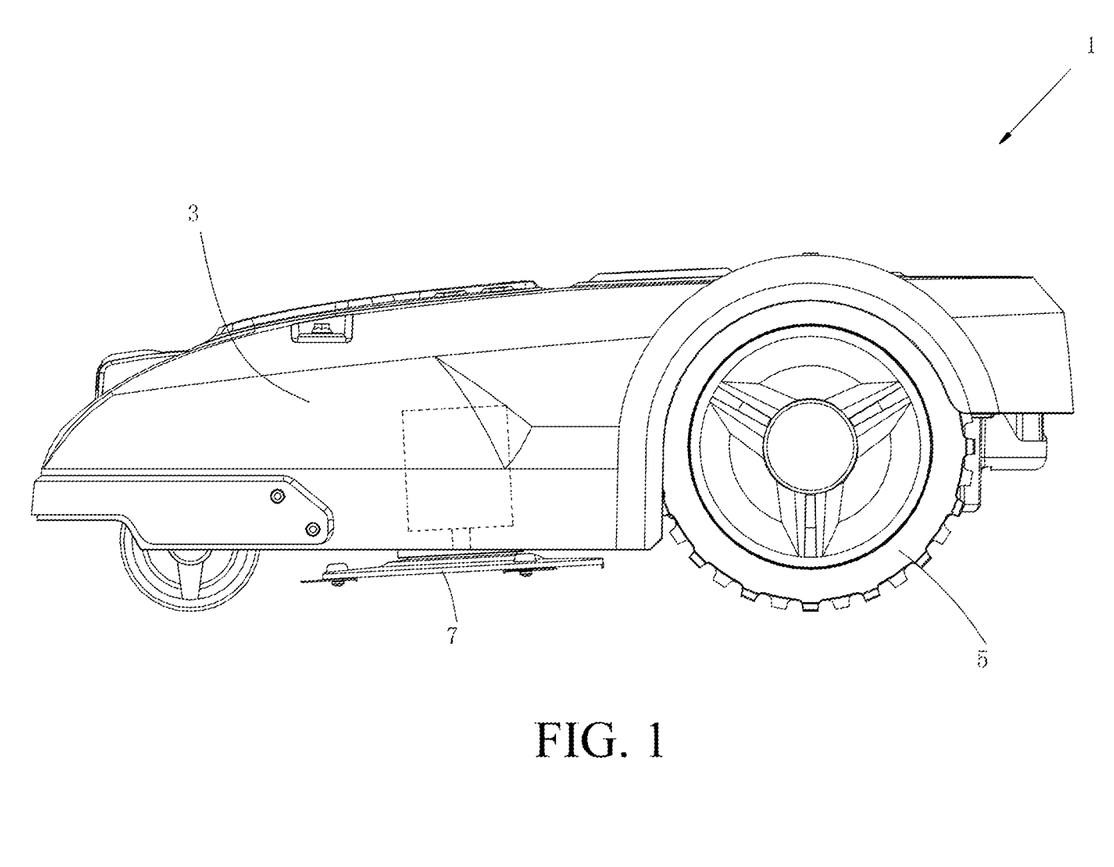
FIG. 1 is a schematic structural diagram of a self-moving device according to a first embodiment of the present invention.

FIG. 1 is a schematic structural diagram of a self-moving device according to a first embodiment of the present invention. In this embodiment, the self-moving device is an automatic lawn mower 1. In another embodiment, the self-moving device may be alternatively an unattended device such as an automatic vacuum cleaner and an automatic snowplow. As shown in FIG. 1, in this embodiment, the automatic lawn mower 1 includes a housing 3, a movement module 5, a cutting module 7, an energy module (not shown), a control module (not shown), and the like. The movement module 5, the cutting module 7, the energy module, and the control module are all mounted at the housing. The movement module 5 includes a wheelset driven by a drive motor to enable the automatic lawn mower 1 to move. The cutting module 7 includes a blade that is mounted at the bottom of the housing 3 and is driven by a cutting motor to rotate to perform grass cutting work. The energy module includes a battery pack supplying power for the automatic lawn mower 1 to move and work. The control module is electrically connected to the movement module 5, the cutting module 7, and the energy module, controls the movement module 5 to enable the automatic lawn mower 1 to move, and controls the cutting module 7 to perform a grass cutting task.

Figure 2:
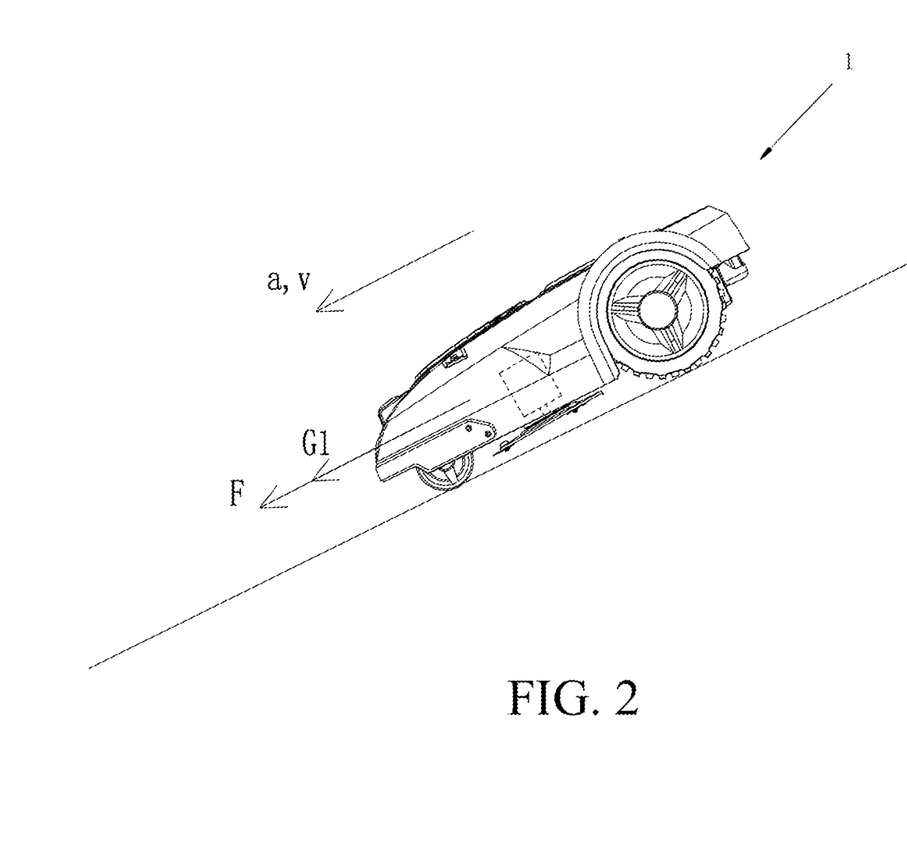
FIG. 2 is a schematic diagram of a working scenario of the self-moving device shown in FIG. 1.

In this embodiment, the automatic lawn mower 1 moves and works in a working region defined by a border. The border includes a boundary of the working region and an obstacle in the working region. When determining that the automatic lawn mower 1 is moving near the border, the control module controls the movement module 5 to enable the automatic lawn mower 1 to turn around or reverse to keep away from the border. Various landforms such as a slope may be included in the working region of the automatic lawn mower 1. In a working scenario, the automatic lawn mower 1 descends the slope, as shown in FIG. 2. As the automatic lawn mower 1 gains speed while descending the slope. If a speed of the automatic lawn mower 1 keeps increasing, when meeting the border, for example, meeting the boundary of the working region, the automatic lawn mower 1 may fail to respond in time to rush across the boundary to pose a safety problem.

To prevent the foregoing problem from occurring, in this embodiment, the automatic lawn mower 1 includes a detection unit, electrically connected to the control module, and detecting a movement and/or status parameter of the automatic lawn mower 1. When the detection unit detects that the movement and/or status parameter of the automatic lawn mower 1 satisfies a preset condition, the control module alternately decreases and increases an acceleration of the movement of the automatic lawn mower 1, to keep the speed of the movement of the automatic lawn mower 1 in a preset range. Specifically, in this embodiment, the detection unit includes an accelerometer, the movement and/or status parameter of the automatic lawn mower 1 includes the acceleration of the movement of the automatic lawn mower 1, and the preset condition is that the acceleration of the movement of the automatic lawn mower 1 is greater than or equal to a first threshold.

Figure 3:
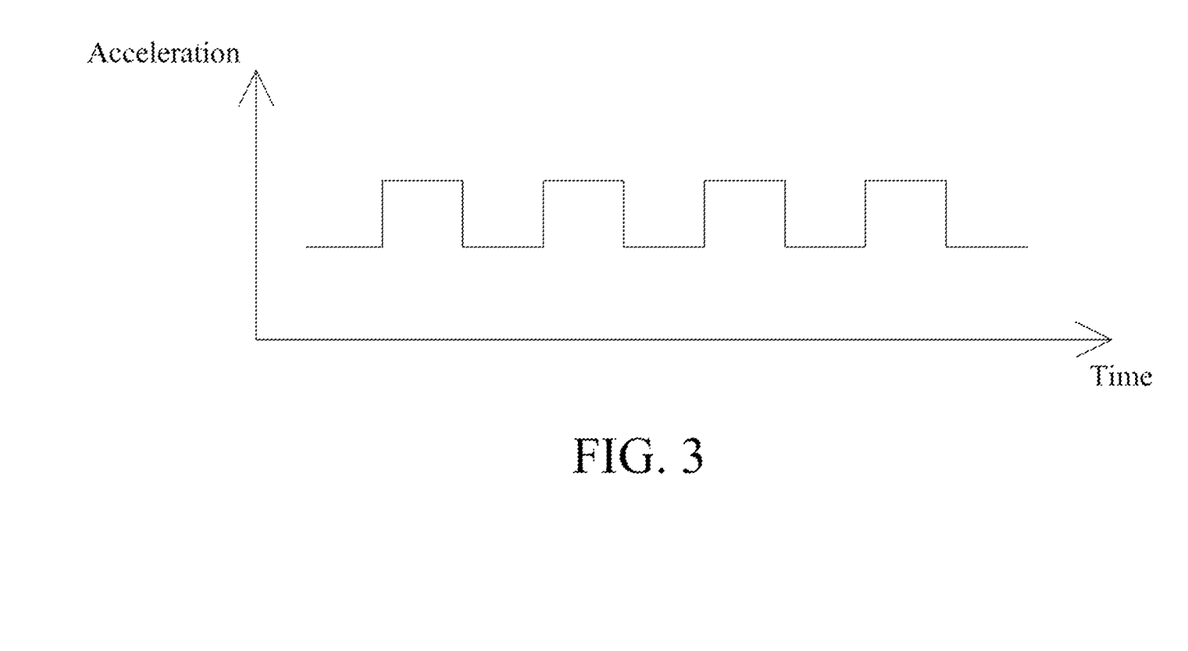
FIG. 3 is a diagram showing a control principle of the self-moving device shown in FIG. 1.

As shown in FIG. 2, when descending the slope, the automatic lawn mower 1 is subject to a downward component force $G_1$ along the slope of the gravity acting on the automatic lawn mower 1 and a driving force F, an acceleration a increases and becomes significantly greater than an acceleration of the automatic lawn mower in a normal working condition. The acceleration a increases to cause a rapid increase in a speed v of the movement of the automatic lawn mower 1. In this embodiment, the accelerometer is used to detect an acceleration of the automatic lawn mower 1 in real time. If the acceleration of the automatic lawn mower 1 is greater than or equal to a first threshold, the control module determines that the automatic lawn mower 1 is in an abnormal working condition. Specifically, in this embodiment, the automatic lawn mower 1 may descend the slope. The first threshold may be obtained by analyzing a difference between the acceleration of the automatic lawn mower 1 in the normal working condition and an acceleration of the automatic lawn mower when descending the slope. When determining that the automatic lawn mower 1 may be descending the slope, the control module decreases the acceleration of the automatic lawn mower 1. For example, the control module keeps the acceleration of the automatic lawn mower 1 to be less than or equal to zero, and the automatic lawn mower 1 decelerates or moves at a constant speed. If the automatic lawn mower 1 keeps decelerating, the speed may decrease to zero and the automatic lawn mower 1 stops, and normal work of the automatic lawn mower is affected. To avoid such a condition, the control module further determines whether the acceleration of the automatic lawn mower is less than or equal to a second threshold. The second threshold is less than the first threshold. The second threshold may be a value less than or equal to zero or may be determined according to tests. When the control module determines that the acceleration of the automatic lawn mower 1 is less than or equal to the second threshold, the acceleration of the automatic lawn mower 1 is increased. For example, the acceleration of the automatic lawn mower 1 is increased to be greater than zero, and the automatic lawn mower 1 starts to gather speed. Similar to the foregoing process, when determining again that the acceleration of the automatic lawn mower 1 is greater than or equal to the first threshold, the control module decreases the acceleration of the automatic lawn mower 1 again to enable the automatic lawn mower 1 to decelerate. A control principle of acceleration is shown in FIG. 3. The acceleration of the automatic lawn mower is alternately decreased and increased to keep the speed of the movement within the preset range. Specifically, the speed of the movement is less than or equal to a preset speed value. The preset speed value may be set according to the speed of the movement of the automatic lawn mower 1 during normal working or may be set according to an extreme speed value when the automatic lawn mower 1 makes a response upon meeting the border.

In this embodiment, the acceleration of the movement of the automatic lawn mower 1 is detected to determine that the automatic lawn mower 1 is descending the slope, and the acceleration of the movement of the automatic lawn mower 1 is then alternately decreased and increased to keep the speed of the automatic lawn mower 1 within the preset range, so that the automatic lawn mower 1 is prevented from moving beyond the border because the speed of the movement is excessively high, and the safety of the automatic lawn mower 1 can be ensured. A series of problems may occur when the automatic lawn mower 1 moves too fast. For example, a lawn may be poorly cut, and the automatic lawn mower 1 may work unstably. Therefore, the solution in this embodiment can resolve a series of problems that occur because the automatic lawn mower 1 descends the slope at an excessively high speed.

In this embodiment, cases in which the acceleration of the movement of the automatic lawn mower is decreased includes: the acceleration is still greater than zero, that is, the direction of the acceleration is still the same as a movement direction of the automatic lawn mower, and in this embodiment, the automatic lawn mower still descends the slope, and the value of the acceleration is decreased; the acceleration is decreased to zero; and the acceleration is decreased to be less than zero, that is, the direction of the acceleration is opposite to the movement direction of the automatic lawn mower, and in this embodiment, in the upward direction along the slope, if the value of the acceleration in the upward direction along the slope is larger, the acceleration decreases to a greater degree.

In this embodiment, the acceleration of the movement of the automatic lawn mower 1 is alternately decreased and increased by alternately decreasing and increasing a working current of the drive motor. When the automatic lawn mower 1 descends the slope, the automatic lawn mower 1 is subject to both the downward component force $G_1$ along the slope of the gravity acting on the automatic lawn mower 1 and the driving force F, and therefore the acceleration a increases. The driving force F decreases and the acceleration a of the automatic lawn mower 1 decreases when the working current of the drive motor decreases. Similarly, the driving force F increases and the acceleration a of the automatic lawn mower 1 increases when the working current of the drive motor increases. Therefore, the acceleration of the automatic lawn mower 1 may be controlled by controlling the working current of the drive motor. Specifically, when the accelerometer detects that the acceleration of the automatic lawn mower 1 is greater than or equal to the first threshold, the control module controls to decrease the working current of the drive motor to decrease the acceleration of the automatic lawn mower 1, and when the acceleration is less than or equal to zero, the speed decreases. When the accelerometer detects that the acceleration of the automatic lawn mower 1 is less than or equal to the second threshold, the control module controls to increase the working current of the drive motor to increase the acceleration of the automatic lawn mower 1, and when the acceleration is greater than or equal to zero, the speed increases.

Specifically, the alternately decreasing and increasing the working current of the drive motor includes alternately switching off and on the working current of the drive motor. The automatic lawn mower 1 brakes and the speed decreases when the control module switches off the working current of the drive motor. The automatic lawn mower 1 restores the original acceleration and the speed increases when the control module switches on the working current of the drive motor. That is, the automatic lawn mower 1 is in a cadence braking state. The automatic lawn mower intermittently brakes. Such a control method may be simply implemented, can effectively control the speed of the movement of the automatic lawn mower 1, and can further prevent the automatic lawn mower 1 from sliding to damage a lawn upon continuous braking.

In this embodiment, the speed of the movement of the automatic lawn mower 1 is controlled by intermittently decreasing the acceleration of the movement of the automatic lawn mower 1. Refer to FIG. 3 for a control principle.

Certainly, the acceleration may be adjusted in another manner. For example, the acceleration may be decreased and increased in a non-jumping and continuous manner. When the acceleration is decreased, the acceleration may be kept from reaching zero and is relatively decreased to slow down acceleration. When the acceleration is increased, the acceleration may still be less than or equal to zero, and is relatively increased to slow down deceleration. The sole purpose is to control the speed of the movement of the automatic lawn mower 1.

In this embodiment, the automatic lawn mower 1 includes a 9-axis gyroscope, and the 9-axis gyroscope is used as the accelerometer. In another embodiment, another apparatus or principle may be used to detect the acceleration of the automatic lawn mower 1.

In a second embodiment of the present invention, the structure and the control method of the automatic lawn mower 1 are similar to those in the first embodiment. A difference lies in that the detection unit detects the speed v of the movement of the automatic lawn mower 1, and when the speed of the movement of the automatic lawn mower 1 is greater than or equal to the first threshold, the control module determines that the automatic lawn mower 1 descends the slope. Specifically, the detection unit includes a tachometer that is mounted at the wheelset and detects a rotational speed of the wheelset to detect the speed of the movement of the automatic lawn mower 1. The acceleration increases and correspondingly the speed of the movement increases when the automatic lawn mower 1 descends the slope. Therefore, the speed of the movement of the automatic lawn mower 1 may be detected to determine whether the automatic lawn mower 1 descends the slope. In this embodiment, a speed control method of the automatic lawn mower 1 is similar to that in the first embodiment. When the tachometer detects that the speed of the movement of the automatic lawn mower 1 is greater than or equal to the first threshold, the control module controls the acceleration of the automatic lawn mower 1 decreases. When the tachometer detects that the speed of the movement of the automatic lawn mower 1 is less than or equal to the second threshold, the control module controls the acceleration of the automatic lawn mower 1 to increase. Both the first threshold and the second threshold may be obtained according to tests or empirical values. It may be understood that when the automatic lawn mower 1 meets other abnormal working conditions, the speed of the movement may also become excessively high. In this case, the control module may also control the acceleration of the automatic lawn mower 1 to control the speed of the movement of the automatic lawn mower 1 to keep the automatic lawn mower 1 in a stable working state.

Certainly, in this embodiment, the detection unit may be another apparatus or principle that can detect the speed of the movement of the automatic lawn mower 1.

In a third embodiment of the present invention, the structure and the control method of the automatic lawn mower 1 are similar to those in the first embodiment. A difference lies in that the detection unit detects a downward tilt angle of the automatic lawn mower 1. When the downward tilt angle of the automatic lawn mower 1 is greater than or equal to a preset angle value, the control module determines that the automatic lawn mower 1 descends the slope. The downward tilt angle of the automatic lawn mower 1 is greater than or equal to the preset angle value, reflecting that the automatic lawn mower 1 is descending the slope whose angle is greater than or equal to a preset angle value. When the angle of the slope is greater than or equal to a particular value, as the automatic lawn mower 1 descends the slope, the speed of the movement of the automatic lawn mower 1 may become excessively high as a result. The preset angle value may be obtained according to tests or empirical value. In this embodiment, the detection unit includes an inclinometer configured to detect the downward tilt angle of the automatic lawn mower 1. In another embodiment, another apparatus or principle may be used to detect the downward tilt angle of the automatic lawn mower 1. In this embodiment, the method for detecting the downward tilt angle of the automatic lawn mower 1 is used, so that it can be determined more directly whether the automatic lawn mower 1 is descending the slope.

Certainly, the foregoing methods for determining whether the automatic lawn mower 1 is descending the slope may be used in combination.

In the embodiment of the present invention, when it is determined that the automatic lawn mower 1 is descending the slope, the acceleration of the movement of the automatic lawn mower 1 is alternately decreased and increased to keep the speed of the movement of the automatic lawn mower 1 within the preset range. In this way, the automatic lawn mower 1 can respond in time if meeting a border while or after descending the slope. In this embodiment, the automatic lawn mower 1 includes a border detection module. Specifically, the border detection module includes a boundary detection sensor, an obstacle detection sensor, and the like. When the border detection module detects that the automatic lawn mower 1 meets a border, the control module controls the automatic lawn mower 1 to turn around or reverse to keep away from the border, and it can be ensured that the automatic lawn mower 1 works safely. The speed at which the automatic lawn mower 1 descends the slope is controlled, so that it can be ensured that a lawn is desirably cut as the automatic lawn mower 1 descends the slope, and it can be ensured that the automatic lawn mower 1 works stably.

The present invention further relates to an automatic working system, including the automatic lawn mower in the foregoing embodiments and a charging station for recharging the automatic lawn mower. The automatic working system may further include a boundary wire, and a movement range and a working range of the automatic lawn mower are defined. When needing to be recharged, the automatic lawn mower may move to the charging station along the boundary wire.

The present invention is not limited to the discussed specific embodiments. All structures and methods based on the concept of the present invention fall within the protection scope of the present invention.

What is claimed is:

1. An automatic lawn mower, moving and working in a working region defined by a border, and comprising:
   a housing;
   a movement module, mounted at the housing, and driven by a drive motor to enable the automatic lawn mower to move;
   a control module, controlling movement and working of the automatic lawn mower; and
   a detection unit, electrically connected to the control module, and detecting one or more movement or status parameters of the automatic lawn mower,
   wherein when the detection unit detects that the one or more movement or status parameters of the automatic lawn mower satisfies a preset condition, the control module alternately decreases and increases an acceleration of the movement of the automatic lawn mower, so as to keep a speed of the movement of the automatic lawn mower in a preset range that is less than or equal to a preset speed value that allows the automatic lawn mower to respond to a border detection and prevent moving beyond the border,
wherein a first one of the movement or status parameters of the automatic lawn mower is the acceleration of the movement of the automatic lawn mower, and
wherein the associated preset condition is that the acceleration of the movement of the automatic lawn mower is greater than or equal to a first threshold.

2. The automatic lawn mower according to claim 1, wherein a second one of the movement or status parameters of the automatic lawn mower is the speed of the automatic lawn mower, and the associated preset condition is that the speed of the automatic lawn mower is greater than or equal to a second threshold.

3. The automatic lawn mower according to claim 1, wherein the detection unit comprises at least one of an accelerometer, a tachometer, an inclinometer, and a gyroscope.

4. The automatic lawn mower according to claim 1, wherein the control module alternately decreases and increases a working current of the drive motor to alternately decrease and increase the acceleration of the movement of the automatic lawn mower.

5. The automatic lawn mower according to claim 4, wherein that the control module alternately reduces and increases a working current of the drive motor comprises alternately switching off and on the working current of the drive motor.

6. An automatic working system, comprising the automatic lawn mower according to claim 1.

7. The automatic lawn mower according to claim 1, wherein a second one of the movement or status parameters of the automatic lawn mower is a downward tilt angle of the automatic lawn mower, and the associated preset condition is that the downward tilt angle of the automatic lawn mower is greater than or equal to a preset angle value.

8. A control method of an automatic lawn mower, the automatic lawn mower moving and working in a working region defined by a border, and the automatic lawn mower comprising a movement module, driven by a drive motor to enable the automatic lawn mower to move, wherein the control method of the automatic lawn mower comprises the following steps:
detecting one or more movement or status parameters of the automatic lawn mower;
determining whether the one or more movement or status parameters of the automatic lawn mower satisfies a preset condition; and
when the preset condition is satisfied, alternately decreasing and increasing an acceleration of the movement of the automatic lawn mower, so as to keep a speed of the movement of the automatic lawn mower in a preset range that is less than or equal to a preset speed value that allows the automatic lawn mower to respond to a border detection and prevent moving beyond the border,
wherein a first one of the movement or status parameters of the automatic lawn mower is a downward tilt angle of the automatic lawn mower, and
wherein the associated preset condition is that the downward tilt angle of the automatic lawn mower is greater than or equal to a preset angle value.

9. The control method according to claim 8, wherein a second one of the movement or status parameters of the automatic lawn mower is the speed of the movement of the automatic lawn mower; and
wherein the determining whether the movement or status parameter of the automatic lawn mower satisfies a preset condition comprises:
determining whether the speed of the movement of the automatic lawn mower is greater than or equal to a first threshold.

10. The control method according to claim 8, wherein a working current of the drive motor is alternately decreased and increased to alternately decrease and increase the acceleration of the movement of the automatic lawn mower.

11. The control method according to claim 10, wherein the alternately decreasing and increasing the working current of the drive motor comprises alternately switching off and on the working current of the drive motor.

12. The control method according to claim 8, wherein the step of alternately decreasing and increasing an acceleration of the movement of the automatic lawn mower comprises:
determining whether the speed or acceleration of the movement of the automatic lawn mower is less than or equal to a second threshold, and if the speed or acceleration is less than or equal to the second threshold, increasing the acceleration of the movement of the automatic lawn mower,
wherein the second threshold is less than the first threshold.

13. The control method according to claim 8, wherein a second one of the movement or status parameters of the automatic lawn mower is the acceleration of the movement of the automatic lawn mower; and
wherein the determining whether the movement or status parameter of the automatic lawn mower satisfies a preset condition comprises:
determining whether the acceleration of the movement of the automatic lawn mower is greater than or equal to a first threshold.

14. An automatic lawn mower, moving and working in a working region defined by a border, the automatic lawn mower comprising:
a housing;
a movement module, mounted at the housing, and driven by a drive motor to enable the automatic lawn mower to move;
a control module, controlling movement and working of the automatic lawn mower; and
a detection unit, electrically connected to the control module, and detecting a movement or status parameter of the automatic lawn mower,
wherein when the detection unit detects that the movement or status parameter of the automatic lawn mower satisfies a preset condition, the control module controls the automatic lawn mower to intermittently brake so as to keep a speed of the movement of the automatic lawn mower in a preset range that is less than or equal to a preset speed value that allows the automatic lawn mower to respond to a border detection and prevent moving beyond the border,
wherein the movement or status parameter of the automatic lawn mower comprises at least one of:
the acceleration of the movement of the automatic lawn mower,
wherein the associated preset condition is that the acceleration of the movement of the automatic lawn mower is greater than or equal to a first threshold; or a downward tilt angle of the automatic lawn mower, wherein the associated preset condition is that the downward tilt angle of the automatic lawn mower is greater than or equal to a preset angle value.

15. The automatic lawn mower of claim 14, wherein the automatic lawn mower intermittently braking is by removing current from the drive motor.

16. A control method of an automatic lawn mower, the automatic lawn mower moving and working in a working region defined by a border, and the automatic lawn mower comprising a movement module, driven by a drive motor to enable the automatic lawn mower to move, wherein the control method of the automatic lawn mower comprises the following steps:
  detecting a movement or status parameter of the automatic lawn mower;
  determining whether the movement or status parameter of the automatic lawn mower satisfies a preset condition; and
  when the preset condition is satisfied, controlling the automatic lawn mower to intermittently brake so as to keep a speed of the movement of the automatic lawn mower in a preset range that is less than or equal to a preset speed value that allows the automatic lawn mower to respond to a border detection and prevent moving beyond the border,
  wherein the movement or status parameter of the automatic lawn mower comprises at least one of:
    the acceleration of the movement of the automatic lawn mower,
      wherein the associated preset condition is that the acceleration of the movement of the automatic lawn mower is greater than or equal to a first threshold; or
    a downward tilt angle of the automatic lawn mower,
      wherein the associated preset condition is that the downward tilt angle of the automatic lawn mower is greater than or equal to a preset angle value.

* * * * *